No. 612,981. Patented Oct. 25, 1898.
C. K. WELCH.
PNEUMATIC TIRE.
(Application filed July 8, 1898.)
(No Model.)
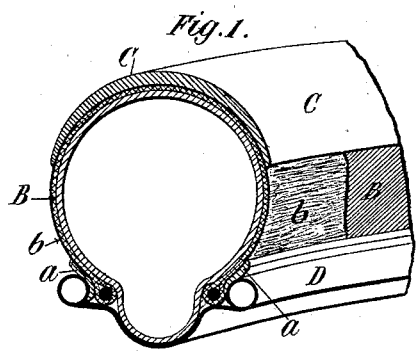
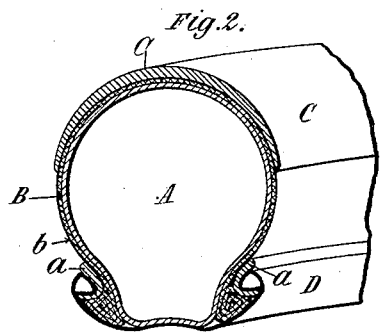
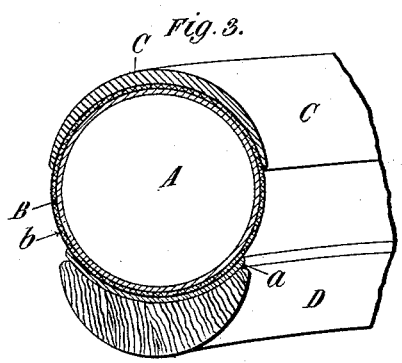
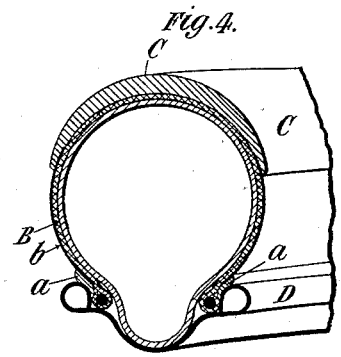
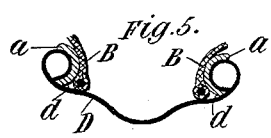
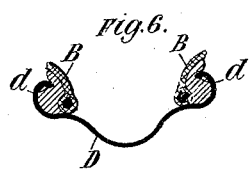
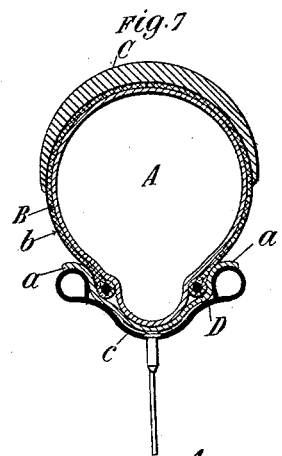
Witnesses:
F. Anna Talbot
Ewell A. Dick
Inventor:
Charles K. Welch
By Kerr, Curtis & Page
attys.

UNITED STATES PATENT OFFICE.

CHARLES KINGSTON WELCH, OF COVENTRY, ENGLAND.

PNEUMATIC TIRE.

SPECIFICATION forming part of Letters Patent No. 612,981, dated October 25, 1898.

Application filed July 8, 1898. Serial No. 685,455. (No model.)

*To all whom it may concern:*

Be it known that I, CHARLES KINGSTON WELCH, engineer, a subject of the Queen of Great Britain, residing at Park House, Coventry, England, have invented certain new and useful Improvements in Pneumatic Tires, of which the following is a specification, reference being had to the accompanying drawings.

This invention relates to improvements in pneumatic tires, and is equally applicable to "double-tube," "single-tube," and the so-called "tubeless" tires.

The chief object of my invention is to produce a pneumatic tire for a bicycle that will permit approximately the same speed to be obtained as with the light racing-tires at present constructed and will at the same time be suitable for use on ordinary roads and in wet weather.

In "Dunlop" racing-tires or tires used on bicycles for riding at a high speed it is usual not to cover with vulcanized rubber the whole of the outer surface of the fabric or inexpansible jacket serving to inclose and retain the air-tube, but to cover only the tread portion, leaving the fabric at the sides of the tire bare, so as to preserve the flexibility thereof, whereby these sides offer very slight resistance to the continuous deformation or lateral expansion of the tire at the point where it bears upon the ground. In such tires, however, the fabric at the sides besides being exposed to wear and abrasion and to moisture and other deleterious influences quickly becomes chafed by the edges or flanges of the wheel-rim, and, moreover, water, mud, dust, or the like will readily penetrate between the sides of the tire and the edges of the rim and injure or destroy the tire, so that it is disadvantageous to use tires of this kind in wet weather or on ordinary roads.

Now according to my invention I cover that portion or portions of the fabric or inexpansible jacket of the tire that is not covered by the strip of vulcanized rubber forming the tread with a thin sheet, membrane, or skin of raw or unvulcanized india-rubber, (preferably cut sheet-rubber of the toughest quality,) so as to efficiently protect the said jacket from moisture or other deleterious influences without detriment to its flexibility, or I may cover the whole of the exterior surface of the jacket with the above-described rubber sheet before attaching the tread thereto.

I cover those portions of the tire that are adjacent to the wheel-rim with a strip or ring or strips or rings of vulcanized india-rubber or other suitable material, so as to form both a resilient and efficient closure between the tire and the rim and also a protection against chafing or wear that might arise from friction on the rim. These strips or rings of india-rubber instead of forming part of the tire may form part of or be attached to the wheel-rim.

In order that my invention may be clearly understood and readily carried into effect, I will describe the same more fully with reference to the accompanying drawings, which show my invention applied, by way of example, to three well-known types of pneumatic tire. It is obvious, however, that my said invention may be applied to any other construction of pneumatic tire whatever irrespective of any particular method of attaching same to the wheel-rim.

Figures 1, 2, and 3 are transverse sections of the well-known "Dunlop-Welch" pneumatic tire and wheel-rim, of a "clencher" tire and wheel-rim, and of a single-tube tire and wheel-rim, respectively, showing my invention applied thereto. Fig. 4 illustrates another form of my improved tire; and Figs. 5, 6, and 7 show further modifications, wherein the protective strip or lining is applied to the wheel-rim.

In all the figures like letters of reference indicate similar parts.

A is the air-tube; B, the inexpansible jacket of the tire; C, the vulcanized-rubber tread, and D the wheel-rim.

According to the construction shown in Figs. 1, 2, 3, and 7, I solution a thin sheet *b* of raw or unvulcanized india-rubber over the entire outer surface of the fabric strip or band forming the inexpansible jacket, after which the tread or wearing-surface is attached thereto. I also attach, as shown in Figs. 1 and 2, two strips or rings *a a* of vulcanized india-rubber arranged at or near the edges of such strip or band, which strips serve to protect the fabric from wear or injury by the rim and also to prevent the ingress of water, dust, or the like between the said cover and rim. It will therefore be seen that between the edges of the vulcanized tread portion and the said protective strips or rings the jacket is merely covered with the thin membrane of raw or unvulcanized india-rubber. By the use of this thin membrane of raw or unvulcanized india-rubber (or india-rubber that has been only very slightly vulcanized) on the lateral portions of the tire I am enabled to obtain an efficiently-protected tire without sacrificing its speed qualities, and, further, this material is not liable to crack, as is the thin side portion of a fully-vulcanized cover, especially when placed in the sunlight. Moreover, it is not generally practicable to form the side portions of the vulcanized tread so thin as the raw rubber that I propose to use can be formed, because in the process of vulcanizing it is necessary to maintain the material at a high temperature for a time sufficient to vulcanize the thickest portions of the tread, and this amount of vulcanization would be too much for sides as thin as those I am enabled to provide by the use of the special material above mentioned.

In Fig. 3 I have shown a single protective strip $a$ of rubber, which bears on the whole of the internal section of the rim. I may, however, provide single-tube tires with two narrow strips arranged adjacent to the rim edges in the same manner as above described with reference to a tire-cover or outer tube.

In some cases instead of covering the entire outer surface of the fabric with unvulcanized india-rubber I apply such rubber only to the bare side portions of the fabric, as shown in Fig. 4. If desired, I may varnish, paint, or otherwise treat the surface of the said unvulcanized india-rubber between the tread portion and the protective strips, or I may prepare the said rubber with any suitable pigment, so as to give it any desired color.

When I attach the protective strips to the rim, I may employ two narrow strips or rings arranged at the edges thereof, as shown in Figs. 5 and 6, or I may employ a single strip lining the whole of the internal section of the rim, as shown in Fig. 7. I prefer to provide the rim with grooves or recesses $d$, serving to securely retain the strips in place, as shown in Figs. 5 and 6.

When a single strip of rubber is employed adapted to line the entire inner surface of the rim, the tape $c$ for covering the spoke ends may be combined with such strip, as shown in Fig. 7, or such tape may be dispensed with.

The tread of the tire may be molded in any suitable manner to avoid slipping.

I wish it to be understood that for protecting the fabric without detriment to its flexibility I prefer to use tough, raw, or unvulcanized cut sheet-rubber; but obviously a thin sheet of rubber could be so slightly vulcanized as to be practically unvulcanized—that is to say, so as to avoid the difficulty arising from the cracking to which fully or over vulcanized rubber is liable—and therefore the use of such rubber must be considered as coming within the scope of my invention.

I claim—

1. The combination with the inexpansible sheath or jacket of a pneumatic tire of a membrane of substantially unvulcanized india-rubber applied and adherent to the outer surface of said jacket, and a vulcanized band secured to and covering the tread portion only of the tire, and leaving the unvulcanized membrane exposed along the sides of the same, as set forth.

2. In a pneumatic tire, the combination with an inexpansible jacket, and a tread portion partially covering said jacket, of a membrane of unvulcanized india-rubber, and of strips or rings of protected material arranged adjacent to the edges of the wheel-rim, substantially as described and for the purposes specified.

3. In a pneumatic tire, the combination with an inexpansible jacket, a tread portion partially covering said jacket, and a wheel-rim, of a membrane of unvulcanized india-rubber, and of strips or rings of india-rubber arranged between the said jacket and rim at those positions where wear is likely to take place and forming an efficient closure between said tire and rim, substantially as described.

4. In a pneumatic tire, the combination with a fabric jacket and a tread portion partially covering said jacket, of a membrane of unvulcanized india-rubber, of strips or rings of vulcanized india-rubber arranged adjacent to the rim edges, and of a wheel-rim provided with recesses to receive said strips, substantially as and for the purposes specified.

In testimony whereof I have hereunto set my hand this 2d day of May, 1898.

CHARLES KINGSTON WELCH.

Witnesses:
H. ASHBY NORRIS,
W. M. HARRIS.